J. Phillips,
Mower.
Nº 14,250.  Patented Feb. 12, 1856.
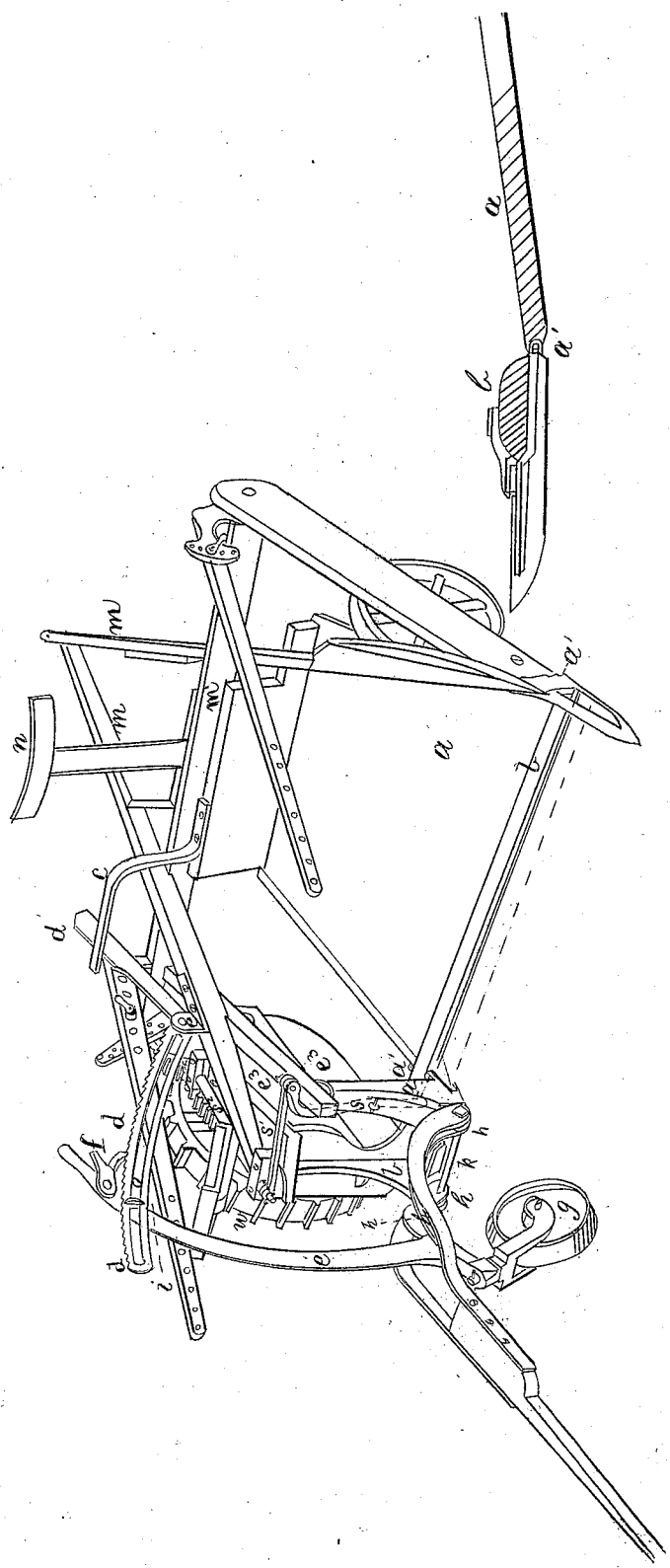

UNITED STATES PATENT OFFICE.

JOB PHILLIPS, OF HARRISBURG, PENNSYLVANIA.

IMPROVEMENT IN GRAIN-HARVESTERS.

Specification forming part of Letters Patent No. 14,250, dated February 12, 1856.

*To all whom it may concern:*

Be it known that I, JOB PHILLIPS, of Harrisburg, in the county of Dauphin and State of Pennsylvania, have invented an Improvement in Machines for Reaping and Mowing; and I do hereby declare that the following is a full, clear, and exact description of the principle or character which distinguishes it from all other things before known, and of the usual manner of making, modifying, and using the same, reference being had to the annexed drawings, of which—

Figure 1 represents a perspective of a front view of my machine; and Fig. 2, a cross-section through the cutter-bar and platform $a$, and showing the hinge $a'$.

My invention consists in several improvements in machines for reaping and mowing, as hereinafter described.

My machine is adapted to side delivery, the raker's stand being centrally placed in rear of the platform. The platform is hinged in front, so as to have motion up and down; but has its downward motion through a given range so restrained by a peculiar device that the rear end of the platform is never below a given height from the ground during the raising and lowering of the front or cutting part of the machine, while at the same time it is free to rise above that height, if necessary, in passing over protuberances. The raising and lowering of the machine is effected by a peculiar arrangement, in which the pivot-wheel used as the fulcrum of movement is placed between the hounds of the draft-pole.

For the purpose of effecting side delivery of the grain I elevate the frame-work which supports the gearing and driver's seat, regulating slide-lever and the axis of the driving-wheel upon two stout iron standards placed in line, or nearly so, with the line of the cutter-bar, so as to allow a large and clear space between the side of the platform and the guard covering the driving-wheel. One of these standards is placed directly at the inner end of the cutter-bar, and the grain being unobstructed laterally after passing this standard, the side delivery is effected with the greatest facility.

$a$ is the platform, hinged at $a'$ to the finger-board $b$, the hinges being of any convenient kind, which will allow the platform to be readily removed when the machine is to be used for mowing. The rear part of the platform has motion up and down, but is checked in its downward motion by the following contrivance: Upon the rear part I fix a curved projection, $c$, so bent as to pass over short arm $d'$ of the regulating slide-lever $d$. This regulating slide-lever has its fulcrum at $e$ upon the frame-work of the machine. Its long arm $d$ has a slot, $o$, throughout its length, through which passes a pin upon the adjusting-lever $e'$.

The upper edge of the long arm $d$ is notched for the purpose of catching the pawl $f$, attached to the adjusting-lever, and arresting the motion of this lever at any desired point. The adjusting-lever $e'$ has for its fulcrum the axis of the pivot-wheel $g$, and is connected with the fore part of the machine by the curved rods $h$ $h$. The king-bolt $k$ passes through eyes in the ends of these rods, so that they have play about its center. When the upper part of lever $e'$ is raised and lowered it raises and lowers the front part of the machine, and as the pin $i$ passes back and forth through slot $o$ it operates to move the arm $d$ up and down, and of course produces reverse motions of the short arm $d'$. The center of motion of the machine being in the axes of the driving and carriage wheels, whenever the front of the machine is raised the rear part is lowered, and if the platform were hung to any fixed part of the frame-work of the machine it would partake of its motions, and its distance from the ground vary with the motions of the machine; but from the contrivance just described it will be seen that the rear end of the platform keeps a fixed distance from the ground, for as the adjusting-lever raises the front of the machine it also, through its operation on the slide-lever, raises the rear end of the platform by means of the curved projection $c$, which rests upon the short arm $d'$.

It will be seen that the platform is free to rise above its lowest point in case it should be obliged to pass over anything higher than that point. The driver controls the adjusting-lever while in his seat. I have chosen to call this movement of the platform "self-adjusting."

As the raker's stand could not consistently with the above devices be connected with the platform, I have located it in its rear and independent of its motions. To effect this I employ two strong converging beams, $m$ $m$, for supporting the stand centrally in rear of the platform, the rest $n$ being attached to the cross-beam $m'$. The motion of the cutters is derived from the driving-wheel $w$ through the medium of vibrating rod $s$, connecting-rod $s'$, crank-shaft $s^2$, and intermediate gearing, partly shown, but which it is not necessary to describe, as it involves nothing specially new or peculiar. The guard-board $e^3$ prevents the grain from being thrown upon the gear and driving wheels. In order to admit of sufficient room for side delivery in my machine, I elevate the frame-work in front upon two standards, $a$ and $b$, placed as far forward as possible, and it will be seen that the beams which support the raker's stand contribute greatly to the strength of the machine in connection with these elevating-standards.

What I claim as my invention, and desire to secure by Letters Patent, is—

The self-adjusting platform hinged at front and so governed in its motions at the rear by the short arm of the regulating slide-lever, or equivalent thereof, as to maintain a fixed distance of the rear part from the ground, while the front part is raised or lowered by the adjusting-lever, as set forth.

JOB PHILLIPS.

Witnesses:
S. CAMPBELL,
CHAS. G. PAGE.